(12) United States Patent
Rusch et al.

(10) Patent No.: US 8,979,420 B2
(45) Date of Patent: Mar. 17, 2015

(54) MARKER FOR PERMEABLE PAVER

(75) Inventors: David P. Rusch, Springville, CA (US); Josue Cortez, Lindsay, CA (US)

(73) Assignee: National Diversified Sales, Inc., Woodland Hills, CA (US)

( * ) Notice: Subject to any disclaimer, the term of this patent is extended or adjusted under 35 U.S.C. 154(b) by 0 days.

(21) Appl. No.: 13/457,928

(22) Filed: Apr. 27, 2012

(65) Prior Publication Data

US 2013/0287493 A1    Oct. 31, 2013

(51) Int. Cl.
  *E01C 5/22*      (2006.01)
  *E01F 11/00*     (2006.01)
  *E01C 9/00*      (2006.01)
  *E01F 9/06*      (2006.01)

(52) U.S. Cl.
  CPC .. *E01F 9/06* (2013.01); *E01C 9/004* (2013.01)
  USPC .......................................................... 404/18

(58) Field of Classification Search
  USPC ........ 404/9, 11–16, 36, 40, 41, 44; 116/63 R; 40/612
  See application file for complete search history.

(56) References Cited

U.S. PATENT DOCUMENTS

| | | | |
|---|---|---|---|
| 70,076 A | 10/1867 | Dean | |
| 1,905,176 A | 4/1933 | Kieckhefer | |
| 2,315,180 A | 3/1943 | Arthur | |
| 2,315,448 A | 3/1943 | Nagin et al. | |
| 2,899,775 A | 8/1959 | Partin | |
| 2,912,910 A | 11/1959 | Wilson et al. | |
| 3,438,312 A | 4/1969 | Becker | |
| 3,597,928 A | 8/1971 | Pilaar | |
| 3,732,020 A * | 5/1973 | Judge et al. | 404/19 |
| 3,764,446 A | 10/1973 | Martin | |
| 3,802,144 A | 4/1974 | Spica | |
| 3,834,789 A * | 9/1974 | Brudy | 359/531 |
| 3,903,702 A | 9/1975 | Appleton et al. | |
| 3,960,375 A | 6/1976 | Bibi-Roubi | |
| 4,008,548 A | 2/1977 | Leclerc | |
| 4,111,585 A | 9/1978 | Mascaro | |
| 4,167,599 A | 9/1979 | Nissinen | |
| 4,358,217 A * | 11/1982 | Stone | 404/16 |
| 4,577,992 A * | 3/1986 | Jefferies | 404/16 |
| 4,584,221 A | 4/1986 | Kung | |
| 4,621,942 A | 11/1986 | Hill | |
| 4,671,699 A | 6/1987 | Roach | |
| 4,798,498 A | 1/1989 | Hallberg et al. | |
| 5,035,531 A * | 7/1991 | Sanchez | 404/12 |
| 5,250,340 A | 10/1993 | Bohnhoff | |
| 5,287,649 A | 2/1994 | Prestele | |
| 5,308,186 A * | 5/1994 | Hedgewick | 404/14 |
| 5,406,745 A | 4/1995 | Lin | |
| 5,507,600 A * | 4/1996 | Takahashi | 405/303 |
| 5,689,912 A | 11/1997 | Prestele | |
| 5,816,738 A * | 10/1998 | Harnapp | 404/18 |
| 6,682,257 B1 * | 1/2004 | Zappe | 404/25 |
| 7,210,876 B2 | 5/2007 | Moralez et al. | |
| 7,563,052 B2 | 7/2009 | Van Reijen | |

(Continued)

*Primary Examiner* — Abigail A Risic
(74) *Attorney, Agent, or Firm* — Fulwider Patton LLP

(57) ABSTRACT

A marker for attachment to a permeable paver that includes a structure having a plurality of honeycombed, hexagon-shaped cells with upstanding sidewalls, the sidewall of each cell having an upper surface and a lower surface, an inner surface and an outer surface, and a thickness, the marker comprising a generally planar cap having a substantially hexagonal perimeter that is dimensioned to span across a hexagon-shaped cell of the paver such that the perimeter of the cap substantially matches the outer surface of the sidewalls of the cell.

8 Claims, 3 Drawing Sheets

(56) References Cited

U.S. PATENT DOCUMENTS

| | | |
|---|---|---|
| 7,568,980 B1 | 8/2009 | Janus et al. |
| 2006/0193692 A1* | 8/2006 | Kim et al. .................. 404/16 |
| 2007/0201948 A1* | 8/2007 | Harward et al. ................ 404/15 |
| 2008/0179791 A1* | 7/2008 | Bown et al. ................ 264/328.1 |
| 2009/0304444 A1* | 12/2009 | Pretola ............................ 404/14 |

* cited by examiner

MARKER FOR PERMEABLE PAVER

BACKGROUND

The field of the present invention relates generally to support mats configured to permit the load of a massive object, such as a vehicle or pedestrian traffic, to move over the surface of permeable turf or graveled areas without significant compaction or other damage to the surface. The present invention relates to such support mats that comprise a plurality of upstanding, open cell members configured for turf to grow through the mat or for gravel to be leveled off to a smooth plane. More particularly, the present invention relates to a system and method for applying markings to such mats, after they have been laid, that will permit vehicles or pedestrians to find their way over the surface to designated parking or movement areas.

As well known to those in the turf and paving industries, there are numerous circumstances when it is necessary or desirable to be able to drive vehicles over turf areas, such as grassy or graveled areas, instead of the typical asphalt, concrete or other solid materials normally used as the load bearing material for roadways or vehicle pathways. Driving vehicles of any substantial weight or at any speeds other than at very low speeds over a turf area can easily result in substantial damage to the turf, particularly if the turf area is wet or configured with turf that is particularly susceptible to damage. Worse yet, vehicles may become bogged down in a saturated surface, requiring extensive damage to the surface in order to extract the vehicle. Despite the potential for damage to the turf, driving vehicles over the turf may occur out of necessity when the turf area is used for temporary or overflow parking, to temporarily connect different parking areas and to permit temporary access across the turf to facilities or for various emergency situations. Allowing vehicles to drive over turf areas is desirable when, often for aesthetic purposes or to avoid interfering with the purpose of the turf area (i.e., golf courses), the owners or operators of the turf areas prefer to not have paths made up of the typical solid roadway materials cutting across the turf area, which would thereby divide the turf area into disconnected segments. Examples of turf areas where the use of standard roadway materials are often not desired include golf cart paths, service roads through or overflow parking areas in parks and other park-like areas, residential driveways, emergency vehicle access lanes, grass air strips and the like. As well known, movement of vehicles across the turf can result in ruts in the turf, tearing of the turf and undesirable compaction of the turf and/or soil underneath that can inhibit or prevent normal turf growth.

To prevent damage to the turf from the movement of vehicles, such as cars, trucks, golf carts, emergency vehicles and other such vehicles, across or through the turf area it is common to utilize load bearing mats embedded or otherwise placed in or on the turf. Commonly, these load bearing mats are made up of a plurality of individual mat units and generally configured with a plurality of connected cell or cell-like members that are of sufficient strength and surface area to support the weight of the vehicle or other load bearing traffic as it moves over the turf. Many of the load bearing mats have cell members that are configured, at least to a certain extent, to allow the turf to grow through the load bearing mat and to allow water and other nutrients to reach the roots of the turf. The load bearing mats are typically placed in the turf or soil base just below the grade level of the turf so that conventional turf equipment, including lawnmowers and the like, can move over the turf and cut or treat the turf. To allow for different sizes of areas where load bearing mats are utilized, the typical load bearing mat is provided in modular mat units that can be selectively connected together to provide the desired amount of load bearing surface (i.e., parking lot sized area). The area enclosed by the cell members are filled with soil or other materials. In turf areas, the fill material preferably comprises that which facilitates the growth of turf through the load bearing mat. To facilitate gripping of the subsurface by the load bearing mat, drainage through the turf and oxygen transfer by the turf, it is generally desirable that the base of the individual cell members have as much opening as possible.

The use of load bearing mats to provide support in turf areas is not limited to use with areas where vehicles may move across or through the turf area. In addition, load bearing mats are also utilized in areas subject to heavy pedestrian or other non-vehicle load bearing traffic, such as for walking and/or bicycle paths through a park or park-like settings. Use of load bearing mats are also beneficially utilized on campus open areas where students are likely to cut across the turf and in areas around nursing homes or hospitals where persons may want to push another person in a wheelchair or use other equipment. Use of load bearing mats to prevent damage to turf is known to be particularly advantageous in areas where water or other fluids may commonly collect after watering or rain.

Examples of load bearing mats for use in turf areas can be found in numerous prior art patents. For instance, U.S. Pat. No. 4,621,942 to Hill describes a grass paving structure having a plurality of honeycombed, hexagon-shaped cells with upstanding sidewalls and a plurality of openings in the underlying base surface. In one configuration, as sold by National Diversified Sales, Inc. (the assignee of the present invention) under the name Tufftrack® Grassroad Pavers, the load bearing members are sold in two foot by two foot interlocking sections that can be connected together to cover any size of area.

Another example is U.S. Pat. No. 7,210,876 to Moralez, which also describes a grass paving structure having a plurality of honeycombed, hexagon-shaped cells with upstanding sidewalls and a plurality of openings in the underlying base surface. In this configuration, as sold by National Diversified Sales, Inc. under the name EZ Roll® Grass Pavers, the load bearing members are sold in interlocking sections that can be connected together to cover any size of area. However, in this configuration, the sections can be rolled into a large cylindrical roll which makes transportation and placement much easier.

In the described context of such reinforced paving structures for turf areas, a further problem has become apparent. Such paving structures have proven to be so successful in their general purpose that it is now common to see traffic directed onto reinforced turf areas in volumes high enough to give rise to traffic congestion and related problems. For example, a large open field may have its surface reinforced to provide general access to scores, or perhaps even hundreds, of vehicles at a sporting event. In order to control the efficient parking of these vehicles, organizers may typically place cones on, or insert flags into, the turf surface to direct traffic. Alternatively, the turf surface may be painted or marked with lime powder according to known methods. However, these are temporary measures, because any imposed structures must be subsequently removed, and paint or lime will wash away within a short period of time. Thus, there is a constant need to install and remove, and generally manage the markers on such a reinforced surface from time to time when the surface is used for traffic. This may become a labor intensive activity with attendant problems.

Thus there is a need in the art for a more permanent system and method of marking reinforced paving structures for use by traffic. The present invention addresses these and other needs.

SUMMARY OF THE INVENTION

In a preferred embodiment, the invention is a marker for attachment to a permeable paver, where the permeable paver includes a structure having a plurality of honeycombed, hexagon-shaped cells with upstanding sidewalls, the sidewall of each cell having an upper surface and a lower surface, an inner surface and an outer surface, and a thickness. The marker in a preferred embodiment comprises a generally planar cap having a substantially hexagonal perimeter that is dimensioned to span across a hexagon-shaped cell of the paver such that the perimeter of the cap substantially matches the outer surface of the sidewalls of the cell. Three elongate legs are provided and are evenly spaced around the perimeter of the cap, each leg being positioned adjacent a corner of the hexagonal perimeter, and extending perpendicularly from the cap. A barb is positioned at a tip of each leg, each barb being configured to snag onto the lower surface of the upstanding sidewall of the paver.

In a preferred aspect, the marker further includes three studs spaced around the perimeter of the cap, each stud extending perpendicularly from the cap, the studs being evenly interspersed between the legs and positioned adjacent a corner of the hexagonal perimeter. In an additional aspect, the marker may include at least one rib extending between a first leg and a stud positioned diametrically opposite the first leg, wherein the rib is attached to the planar cap along the length of the rib, and the rib extends perpendicularly from the cap. Preferably, a rib extends between each leg and a diametrically opposite stud, so that there are preferably three ribs. In this configuration, the three ribs intersect at a center point of the cap.

In a further preferred aspect, an upper surface of the cap defines a curve that gives the upper surface a domed shape. The radius of curvature of the upper surface is preferably between 80% and 140% of the length of the span of the cap, the span being the distance between two opposite corners of the cap.

In yet a further preferred aspect of the invention, the marker is dimensioned such that a first imaginary line may be drawn along one edge of the hexagonal cap, and a second imaginary line may be drawn along an adjacent edge of the hexagonal cap to form a point of intersection adjacent a leg; a third imaginary line may be drawn tangent to the adjacent leg parallel to the first line and a fourth imaginary line may be drawn tangent to the adjacent leg parallel to the second line. Under this configuration, the distance between the first line and the third line and the distance between the second line and the fourth line is each not less than the thickness of the sidewall of the cell. Under this configuration, the perimeter of the cap is configured to substantially match the outer surface of the sidewalls of the cell, thereby providing an adequate support for the cap to span across the cell, and also providing no or insubstantial overlap of the cap over the edges of the cell, making it difficult to tamper with the marker once it is attached to the permeable paver.

These and other advantages of the invention will become apparent when read in conjunction with the drawings and the detailed description of the preferred embodiments.

DETAILED DESCRIPTION OF THE PREFERRED EMBODIMENTS

Figure 5:
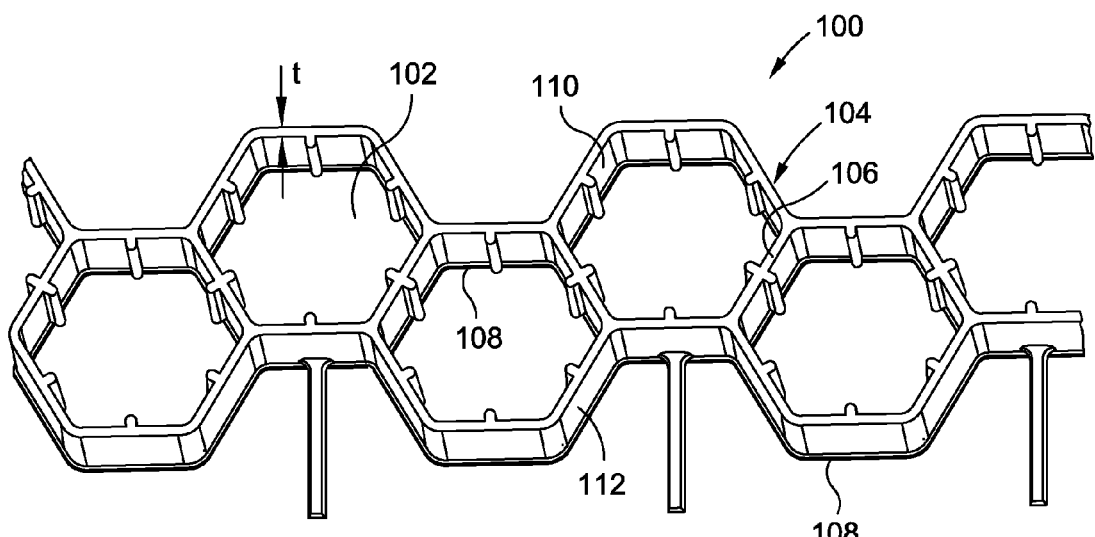
FIG. 5 is a perspective view obliquely from above, of a typical permeable paver used and known in the art.
Figure 6:
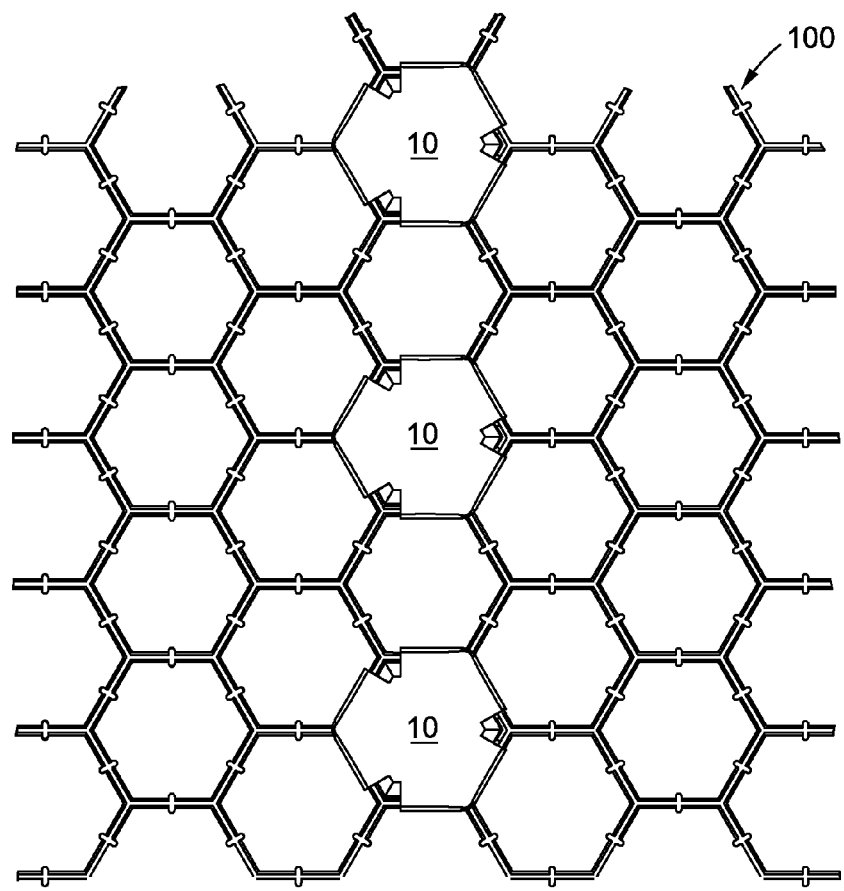
FIG. 6 is a perspective view obliquely from above, of the marker for permeable paver of FIG. 1, showing the marker being used in conjunction with a permeable paver.

With reference to the figures, there is described a system and method having features of the present invention for marking a permeable paver such as the paver identified by the numeral 100 in FIG. 5. As described above, such permeable pavers 100 are known, and typically include a structure having a plurality of honeycombed, hexagon-shaped cells 102 with upstanding sidewalls 104, the sidewall of each cell having an upper surface 106 and a lower surface 108, an inner surface 110 and an outer surface 112, and a thickness "t" as seen in FIG. 5.

Generally, the paving marker of the present invention is configured to be attached to the upper surface 106 of a permeable paver that has been laid on a turf surface so that a user may attach a plurality of such markers to the paver to form a "dotted" line or a curve visible from above. Thus, a turf field reinforced with a permeable paving system may be marked out as desired with markers of the present invention, thereby providing guidance and direction to traffic moving on the surface of the paver, while turf protruding from the paver may still be cut or trimmed without disturbing the markers or the paving system.

In a preferred embodiment of the invention exemplified in FIGS. 1-4, the marker of the present invention is generally identified by the reference numeral 10, and is shaped to have a number of advantageous features and characteristics. In a first aspect, the marker includes an upper cap 12 having a generally planar configuration that is shaped to cover a cell opening 102 in a permeable paver 100. Preferably, the plan outline of the cap 12 defines a substantially hexagonal shape as seen in the figures, with an outer dimension that is sufficient to span the hexagonal space of a cell 102, while resting on the sidewalls 104 surrounding the cell.

Figure 4:
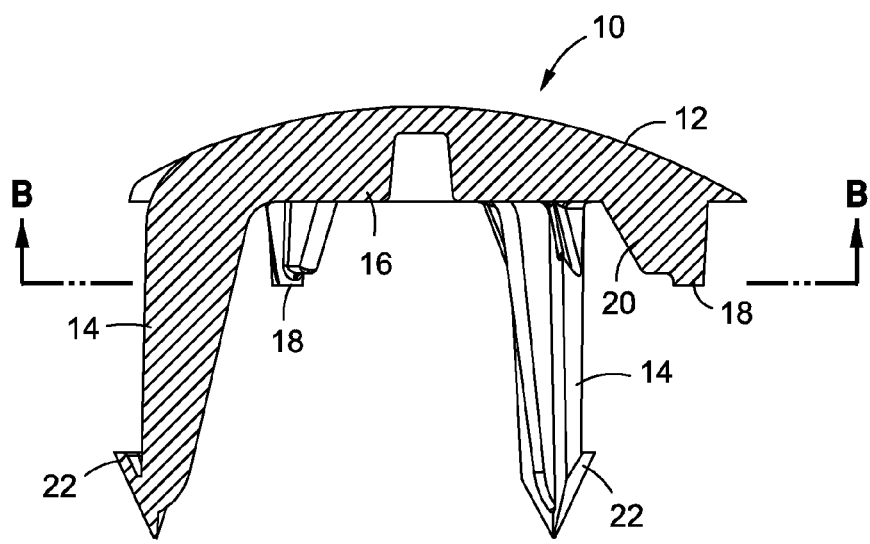
FIG. 4 is a sectional view of the marker for permeable paver shown in FIG. 1, taken substantially along the line A-A in FIG. 1.

In a further aspect, the cap 12 has a domed shape as seen most clearly in FIG. 4. The upper surface of the cap follows an outside convex radius of preferably between 80% to 140% of the length of the span of the cap, the span being the distance between two opposite corners of the cap. This radius provides a three-fold advantage—(a) increasing the span strength of the cap, (b) providing a raised portion that will protrude above debris that may collect above the paver, and also (c) discharging water off the upper surface of the cap.

In order to securely connect the cap 12 to the upper surface of a permeable paver 100, the cap is provided with three legs 14, adjacent the outer perimeter of the cap, that are configured to extend downwardly. At the bottom of each leg, a barb 22 is positioned and is configured to snag onto the lower edge 108 of a permeable paver 100. Thus, when all three legs are inserted into a cell 102 of the paver, a user may apply a downward force on the upper surface of the cap 12, whereupon each of the three legs is forced to occupy a corner of the hexagonal cell and to slide downwardly within a corner defined by two sides of the hexagon-shaped cell. Each leg is slightly elastically deformed toward the radial center of the marker by the downwardly moving barb which naturally tends to protrude radially outwardly slightly beyond the perimeter of the walls of the cell 102. When the barb of each leg is thus manually forced to move past the lower surface of the paver, the elastically deformed leg straightens, to urge the barb radially outward underneath the lower surface 108 of the paver, allowing the barb 22 to snap into place and snag onto the lower surface in the corner of the cell and to secure the marker 10 to the paver 100.

When thus positioned, the marker is visible from above. When placed in conjunction with a plurality of markers, the markers may form a visible "dotted" line or a curve suitable for directing traffic moving over the surface of the turf paver 100. The marker may be given varying colors, much like paint for road marking, so that parking bays, no-cross lines, and the like may be identified.

In a further aspect of the invention, the marker may have additional features that are configured to improve and strengthen the marker. It will be appreciated by one skilled in the art of permeable paving design that the wheels of a vehicle moving over a marker may apply large sheer forces to the marker, especially if a wheel is caused to turn sharply while it is in contact with the marker and the vehicle is moving slowly. Such turning may tend to slide or twist the marker across the top of the paver, thereby imparting large sheer forces to the legs 14. In order to improve the resistance of the marker to such sheer forces, the cap may be provided with additional features in the form of studs 18 that are configured to extend downwardly from the cap 12, parallel with the legs 14. The studs preferably have a cylindrical cross section, and may be additionally reinforced by radially aligned walls 20 that extend downwardly and radially inwardly toward the center of the marker. The studs 18, as affixed to the cap 12, are configured to fit precisely into the unoccupied corners of a hexagonal cell 102 of a permeable paver, so that in the event a sliding sheer force is applied to the upper surface of a marker, each of the six corners of the cap are equipped to provide sheer resistance, in the form of three legs 14 and three studs 18 with reinforcing walls 20. When a rotational sheer force is applied to the marker 10 in relation to the paver, each of the legs and studs are held against movement by the linear hexagonal cell walls of the paver, thus providing a solid resistance against such movement and against mechanical failure of the marker 10.

In yet a further aspect of the invention, the domed cap 12 is provided with a series of diametrically extending ribs 16 that are configured to extend across the lower surface of the cap 12. Preferably, the ribs extend from one leg 14 adjacent to a corner of the cap 12, to a stud 18 positioned diametrically across from the leg and also adjacent an opposite corner. Thus, there are preferably three ribs 16 that extend across a diameter of the cap 12. Preferably, the lower surfaces of each rib lie on a common plane, as seen in FIG. 4. Thus, the cap is reinforced for loading by large vertical gravitational loads such as vehicles that drive across the domed upper surface of the cap 12. Further preferably, the point at the center of the cap where the three ribs intersect, is occupied by a small cylindrical hole, so that the forces in the ribs are obliged to travel around the hole within thinner webs of the ribs, as seen in FIG. 3.

Figure 1:
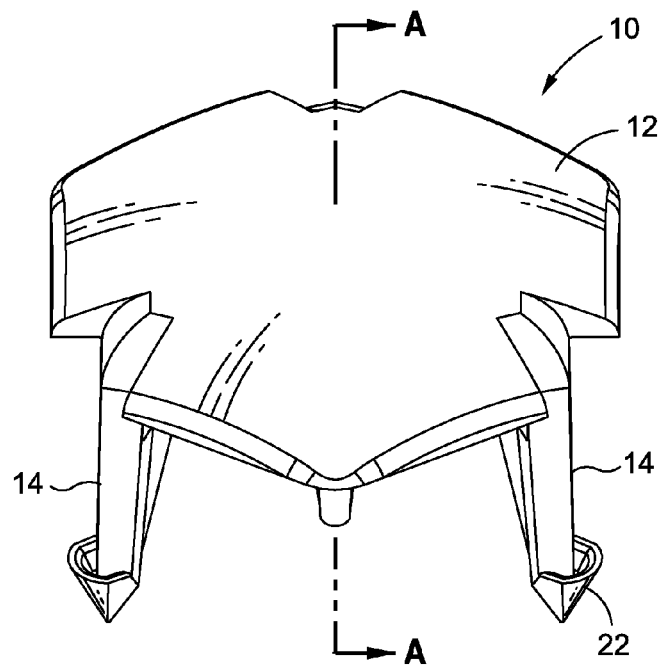
FIG. 1 is a perspective view obliquely from above of a marker for permeable paver having features of the present invention.
Figure 2:
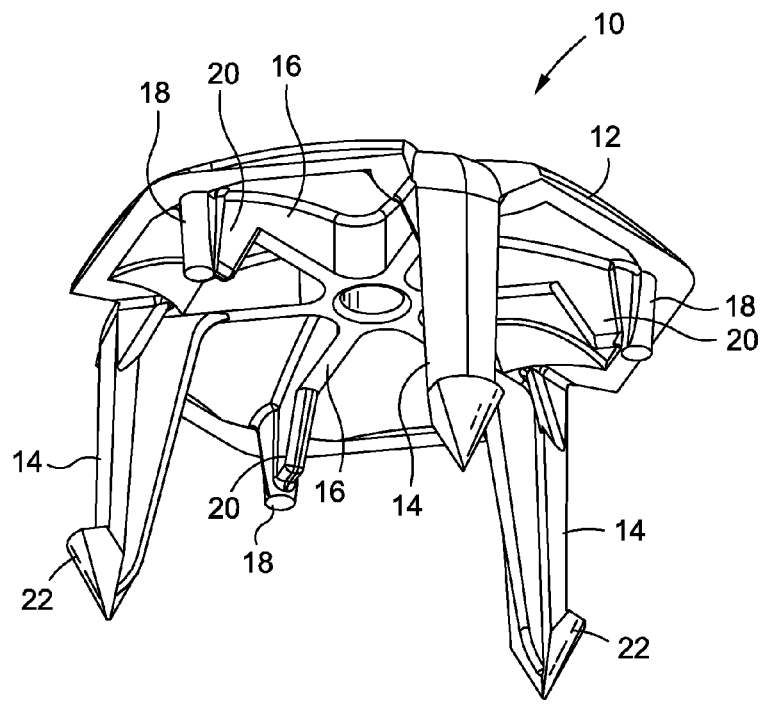
FIG. 2 is a perspective view obliquely from below of the marker for permeable paver shown in FIG. 1.
Figure 3:
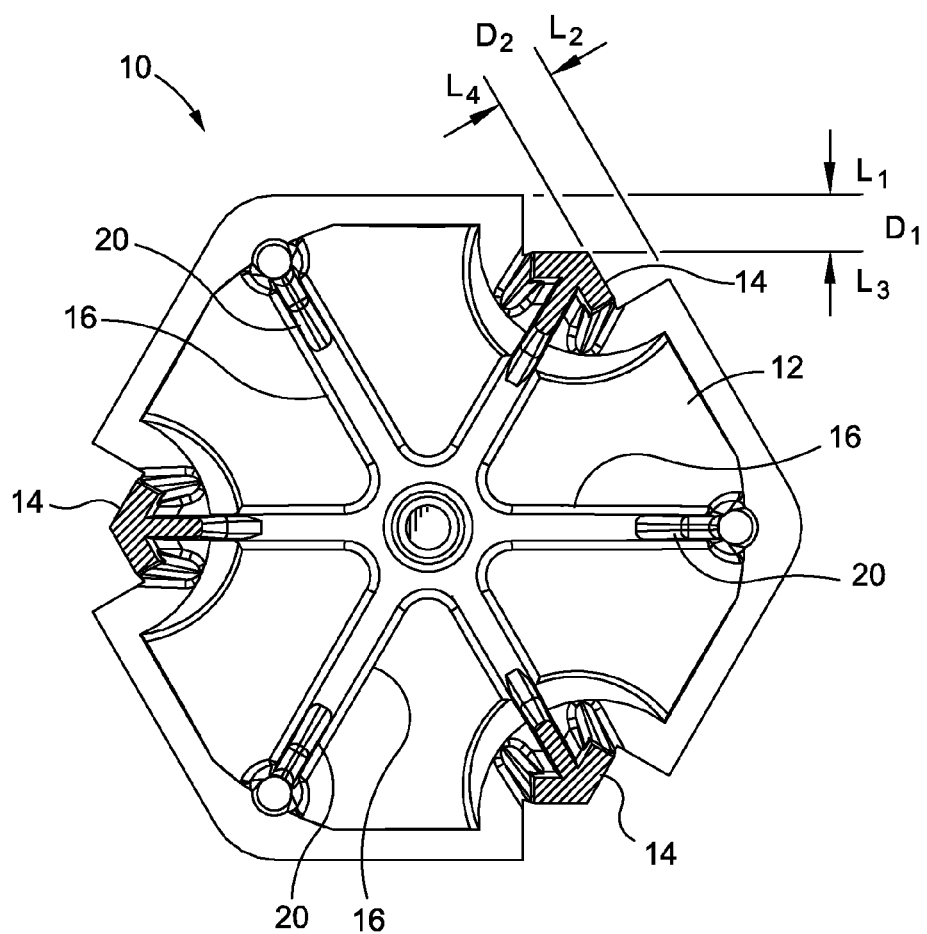
FIG. 3 is a view from below of the marker for permeable paver shown in FIG. 1, with a section being taken substantially along the line B-B in FIG. 4.

In another aspect of the invention, as may be envisaged with reference to FIG. 3, elements of the marker 10 may be dimensioned such that a first imaginary line $L_1$ may be drawn along one edge of the hexagonal cap; and a second imaginary line $L_2$ may be drawn along an adjacent edge of the hexagonal cap to form a point of intersection adjacent a leg 14. A third imaginary line $L_3$ may be drawn tangent to the adjacent leg parallel to the first line; and a fourth imaginary line $L_4$ may be drawn tangent to the adjacent leg parallel to the second line. Under this configuration, the distance $D_1$ between the first line and the third line and the distance $D_2$ between the second line and the fourth line are preferably each configured to be substantially equal to the thickness "t" (FIG. 5) of the sidewall of the cell. Under this configuration two advantages arise: First, the cap 12 of the marker spans from edge to edge of the cell 100 with improved shear resistance. Second, because the cap 12 does not extend substantially beyond the outside of the cell 102, it is difficult to tamper with. A person who wishes to remove the marker from a cell would require a special tool to insert under the cap 12 and cause the barbs to unsnag from the lower surface of the cell.

Thus, there is described an advantageous system and method that provides a solution to problems encountered in the prior art. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

We claim:

1. A system for marking a surface comprising:
a permeable paver that includes a structure having a plurality of honeycombed, hexagon-shaped cells with upstanding sidewalls, the sidewall of each cell having an upper surface and a lower surface, an inner surface and an outer surface, and a thickness;
a marker comprising:
a generally planar cap having a substantially hexagonal perimeter that is dimensioned to span across a hexagon-shaped cell of the paver such that the perimeter of the cap substantially matches the outer surface of the sidewalls of the cell;
three elongate legs evenly spaced around the perimeter of the cap, each elongate leg positioned adjacent a corner of the hexagonal perimeter, and extending perpendicularly from the cap; wherein the marker is dimensioned such that:
a first imaginary line may be drawn along one edge of the hexagonal cap;
a second imaginary line may be drawn along an adjacent edge of the hexagonal cap to form a point of intersection adjacent a leg;
a third imaginary line by be drawn tangent to the adjacent leg parallel to the first line; and
a fourth imaginary line may be drawn tangent to the adjacent leg parallel to the second line;
wherein, the distance between the first line and the third line and the distance between the second line and the fourth line is each not less than the thickness of the sidewall of the cell.

2. The system of claim 1, wherein a barb is positioned at a tip of each leg, each barb being configured to snag onto the lower surface of the upstanding sidewall of the paver.

3. The system of claim 1, further including three studs spaced around the perimeter of the cap and extending perpendicularly from the cap, the studs being evenly interspersed between the legs and positioned adjacent a corner of the hexagonal perimeter.

4. The system of claim 3, further including at least one rib extending between a first leg and a stud positioned diametrically opposite the first leg, wherein the rib is attached to the planar cap along the length of the rib, and the rib extends perpendicularly from the cap.

5. The system of claim 4, wherein the at least one rib includes three ribs, such that one rib extends diametrically between each leg and each stud.

6. The system of claim 5, wherein the three ribs intersect at a center point of the cap.

7. The system of claim 1, wherein an upper surface of the cap defines a curve that gives the upper surface a domed shape.

8. The system of claim 7, wherein the radius of curvature of the upper surface is between 80% and 140% of the length of the span of the cap, said span being the distance between two opposite corners of the cap.

* * * * *